United States Patent
Zhang et al.

(10) Patent No.: US 11,461,803 B2
(45) Date of Patent: *Oct. 4, 2022

(54) CONTENT ITEM SLOT LOCATION SUGGESTIONS

(71) Applicant: Google LLC, Mountain View, CA (US)

(72) Inventors: Guannan Zhang, Shanghai (CN); Zuo Yan, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 382 days.

This patent is subject to a terminal disclaimer.

(21) Appl. No.: 16/552,242

(22) Filed: Aug. 27, 2019

(65) Prior Publication Data

US 2020/0126113 A1 Apr. 23, 2020

Related U.S. Application Data

(63) Continuation of application No. 15/261,157, filed as application No. PCT/CN2014/082949 on Jul. 24, 2014, now Pat. No. 10,402,852.

(51) Int. Cl.
*G06Q 30/02* (2012.01)
*G06F 16/9535* (2019.01)
(Continued)

(52) U.S. Cl.
CPC ... *G06Q 30/0243* (2013.01); *G06F 16/24578* (2019.01); *G06F 16/90324* (2019.01); *G06F 16/9535* (2019.01); *G06Q 30/0201* (2013.01)

(58) Field of Classification Search
USPC .................................. 705/14.1, 14.42, 319
See application file for complete search history.

(56) References Cited

U.S. PATENT DOCUMENTS 8,229,915 B1 * 7/2012 Lloyd ............... G06Q 30/0277
711/6
8,626,585 B1 * 1/2014 Mhatre ............. G06Q 30/0276
705/14.42

(Continued)

FOREIGN PATENT DOCUMENTS

CN 102119385 A 7/2011
KR 20090046670 A 5/2009
WO WO-2011/094661 A1 8/2011

OTHER PUBLICATIONS

Development of Display Ads Retrieval System to Match Publisher's Contents (Year: 2013).*

(Continued)

*Primary Examiner* — Gautam Ubale
(74) *Attorney, Agent, or Firm* — Marshall, Gerstein & Borun LLP

(57) ABSTRACT

Methods, systems, and apparatus, including computer programs encoded on a computer storage medium, for distributing content items. In one aspect, a method includes receiving user interaction data specifying user interactions with a publisher resource. A heat map specifying levels of user interaction with various portions of the publisher resource is created. Content item slot performance information specifying one or more performance measures for content items presented in various candidate content item slot locations are identified. One of the candidate content item slot locations is selected based on the heat map and the one or more performance measures. Data that cause presentation of suggestion information that identify the one candidate content item slot location as a suggested content item slot location are generated and output.

16 Claims, 6 Drawing Sheets

(51) Int. Cl.
*G06F 16/2457* (2019.01)
*G06F 16/9032* (2019.01)

(56) References Cited

U.S. PATENT DOCUMENTS

| | | | | |
|---|---|---|---|---|
| 8,689,108 | B1* | 4/2014 | Duffield | G06Q 30/02 |
| | | | | 715/744 |
| 9,552,437 | B1* | 1/2017 | Mortensen | G06F 40/134 |
| 9,665,556 | B1 | 5/2017 | Sutariya et al. | |
| 9,684,929 | B1* | 6/2017 | Shapiro | G06Q 30/08 |
| 2013/0080974 | A1 | 3/2013 | Suzuki | |
| 2014/0095257 | A1* | 4/2014 | Lewis | G06Q 50/01 |
| | | | | 705/7.33 |
| 2015/0051984 | A1* | 2/2015 | Hummel | G06Q 30/0275 |
| | | | | 705/14.71 |
| 2015/0066579 | A1 | 3/2015 | De Paris et al. | |
| 2015/0154650 | A1 | 6/2015 | Umeda | |
| 2017/0178178 | A1* | 6/2017 | Zhang | G06F 16/24578 |
| 2017/0300456 | A1* | 10/2017 | Rimmer | G06F 40/189 |
| 2017/0309046 | A1* | 10/2017 | Demiralp | G06T 11/206 |
| 2017/0310567 | A1* | 10/2017 | Demiralp | H04L 43/08 |
| 2017/0316431 | A1 | 11/2017 | Goodhart et al. | |

OTHER PUBLICATIONS

Third-Party_Web_Tracking_Policy_and_Technology (Year: 2012).*
Adscape: Harvesting and Analyzing Online Display Ads (Year: 2014).*
International Search Report on Appln. Ser. No. PCT/CN2014/082949 dated Apr. 29, 2015 (3 pages).
Non-Final Office Action on U.S. Appl. No. 15/261,157 dated Feb. 6, 2019 (10 pages).
Notice of Allowance on U.S. Appl. No. 15/261,157 dated Apr. 22, 2019 (6 pages).
Written Opinion on Appln. Ser. No. PCT/CN2014/082949 dated Apr. 29, 2015 (3 pages).

* cited by examiner

CONTENT ITEM SLOT LOCATION SUGGESTIONS

CROSS-REFERENCE TO RELATED APPLICATIONS

The present application claims priority under 35 U.S.C. § 120 as a continuation of U.S. patent application Ser. No. 15/261,157, filed Sep. 9, 2016, which is a U.S. National Stage Application under 35 U.S.C. § 371 of PCT International Application Number PCT/CN2014/082949, filed Jul. 24, 2014, each of which is incorporated herein by reference in its entirety.

BACKGROUND

This specification relates to data processing and content distribution.

The Internet facilitates the exchange of information and transactions between users across the globe. This exchange of information enables content sponsors to provide sponsored content to a variety of users. A content sponsor can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item provided by a content sponsor is deemed eligible to be provided for presentation.

SUMMARY

In general, one innovative aspect of the subject matter described in this specification can be embodied in methods that include the actions of receiving, for a publisher resource, user interaction data specifying user interactions with the publisher resource; creating, based on the user interaction data, a heat map specifying levels of user interaction with various portions of the publisher resource; identifying, for various candidate content item slot locations on the publisher resource, content item slot performance information specifying one or more performance measures for content items presented in each of the various candidate content item slot locations; selecting one of the various candidate content item slot locations based on the heat map and the one or more performance measures; and generating and outputting data that cause presentation, to a publisher of the publisher resource, of suggestion information that identify the one of the various candidate content item slot locations as a suggested content item slot location in the publisher resource. Other embodiments of this aspect include corresponding systems, apparatus, and computer programs, configured to perform the actions of the methods, encoded on computer storage devices.

These and other embodiments can each optionally include one or more of the following features. Methods can include the actions of generating and providing instructions defining a content item slot at the content item slot location in the publisher resource.

Methods can include the actions of obtaining performance data for content items presented in the content item slot of the publisher resource; and providing a new suggested content item slot location based on the performance data for the content items.

Identifying content item slot performance information can include identifying resources having heat maps that are considered to match the heat map of the publisher resource; obtaining performance data for content items that were presented in content item slots at locations of the resources that correspond to the various candidate content item slot locations; and determining, for each of the various candidate content item slot locations and based on the performance data, the content item slot performance information based on the performance of the content items presented in the content item slots that are at locations of the resources corresponding to a location of the various candidate content item slot.

Selecting one of the various candidate content item slot locations can include ranking the various candidate content item slot locations based, at least in part, on a function of the content item slot performance information; and selecting at least a highest ranked candidate content item slot location as a suggested content item slot location for the publisher resource.

Ranking the various candidate content item slot locations can include ranking each of the various candidate content item slot locations based on a mathematical combination of a cost-per-mille for the candidate content item slot location and a conversion-per-dollar for the candidate content item location.

Identifying content item slot performance information can include determining, for each candidate content item slot, the cost-per-mille and the conversion-per-dollar based, at least in part on a portion of the heat map corresponding to the location of the candidate content item slot.

Particular embodiments of the subject matter described in this specification can be implemented so as to realize none, one, or more of the following advantages. Locations of content item slots on publisher resources can be selected to help limit the chances that users will inadvertently click on content items. The locations of the content item slots can also be selected near locations where users focus a high level of attention (e.g., as indicated by long pointer dwell times) so that a user will likely review a content item in detail prior to clicking on the content item. Locations of a publisher resource that provide benefits to both publishers and content sponsors can be selected.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes apparatus, systems, methods, and computer readable medium related to suggesting content item slot configurations to resource publishers. In some implementations, the content item slot configurations include a location, size, and/or style of the content item slots. The locations, sizes, and/or styles of the suggested content item slot locations can be determined based on performance measures of similar content item slots on similar resources.

The similar resources can be, for example, resources that have a heat map that is similar to a heat map of the publisher resource for which a content item slot location is being suggested. As discussed in more detail below, a heat map can provide information regarding user interactions with a resource. Areas of higher user interaction (or a particular type of user interaction) can be presented in a first specified color, texture, or pattern, while areas of lower user interaction (or a different type of user interaction) can be presented in a second specified color, texture, or pattern. Resources having heat maps that are very similar can be an indication that content item slot performance for the two resources is likely to be similar, such that performance information for similar resources can be used to predict performance of other similar resources.

The heat maps can also be used to identify areas where content item slots are less likely to obtain inadvertent clicks. For example, using the heat map a particular area of the resource that obtains a relatively high amount of dwell time (e.g., relative to other areas of the resource) and a relatively low number of clicks can be selected as a potential location for a content item slot. Similarly, the shape and/or size of the potential content item slot can be selected based on a size and/or shape of the particular area of the resource that covered by the portion of the heat map corresponding to the high amount of dwell time and the low number of clicks.

Figure 1:
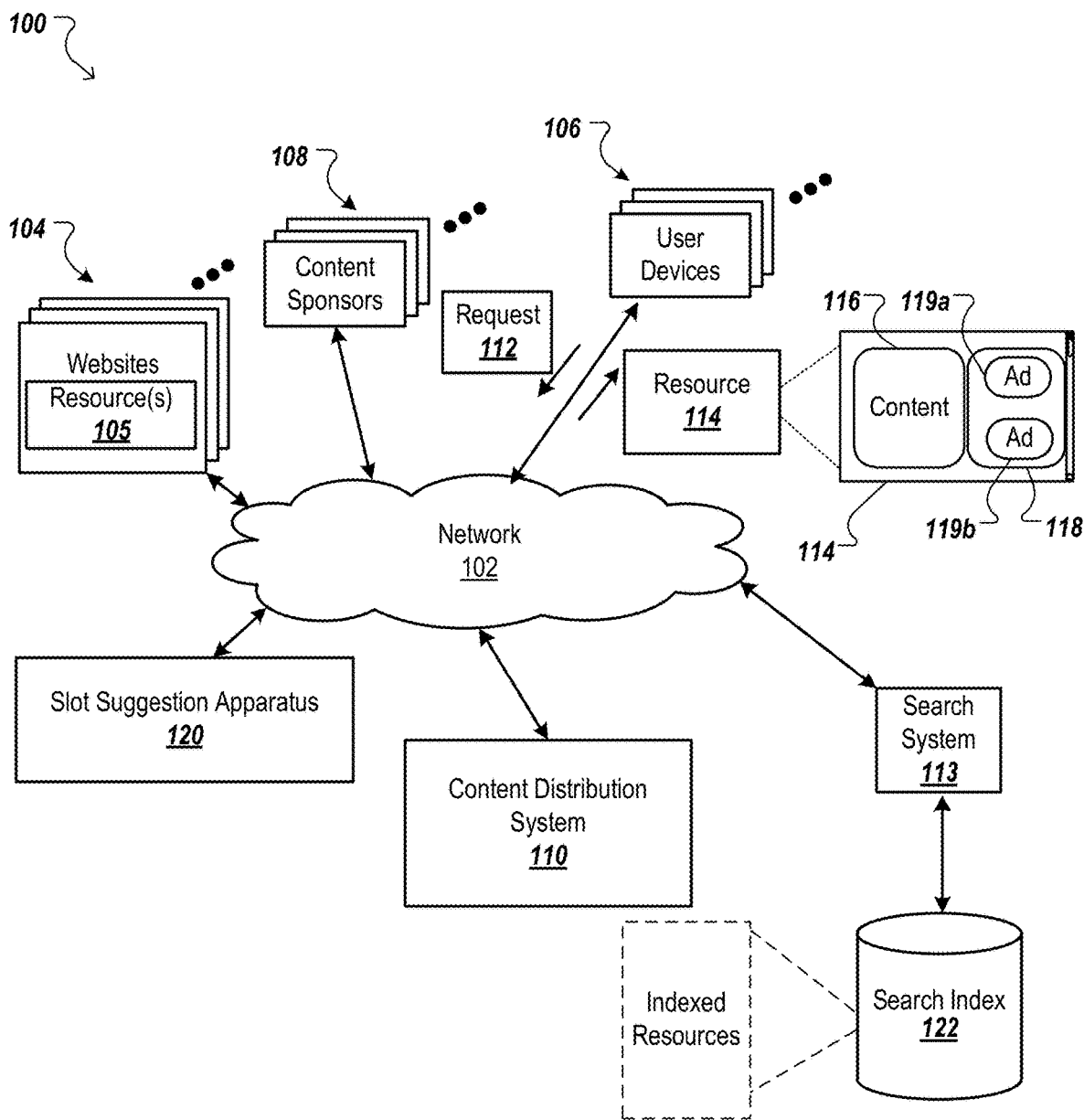
FIG. 1 is a block diagram of an example environment in which content is distributed to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a web page from a social network, or another resource 105. The data representing the requested resource 114 can include data that cause presentation of resource content 116 at the user device 106. The data representing the requested resource 114 can also include data specifying a content item slot 118.

A content item slot is a portion of the resource (e.g., a portion of a web page) or a portion of a user display (e.g., a presentation location of another window or in a slot of a web page) in which one or more content items, such as advertisements, can be presented. A content items slot 118 can also be referred to as an advertisement slot, but any type of content (e.g., content items other than advertisements) can be presented in the content item slot 118.

A single content item slot 118 may be configured to include one or more presentation positions 119a and 119b. Alternatively or additionally, each different content item slot 118 can be considered a separate presentation position, and a resource can include multiple different content item slots. Each presentation position can represent a portion of the content item slot 118 at which a content item can be presented. In some implementations, the number of presentation positions and/or the size of the presentation positions for a particular content item slot 118 may be determined based on the number, type, and/or value of content items that are available for presentation in the content item slot.

To facilitate searching of resources, the environment 100 can include a search system 113 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 113 over the network 102. In response, the search system 113 accesses the search index 122 to identify resources that are relevant to the search query. The search system 113 identifies the resources in the form of search results and returns the search results to the user device in search results page. A search result is data generated by the search system 113 that identifies a resource that is responsive to a particular search query, and includes a link to the resource. An example search result can include a web page title, a snippet of text or a portion of an image extracted from the web page, and the URL of the web page. Like other resources, search results pages can include one or more content item slots 118 in which content items, such as advertisements, can be presented.

When a resource 105 is requested by a user device 106, execution of code associated with a content item slot 118 in the resource initiates a request for one or more content items to populate the slot, which is referred to as a content item request. The content item request can include characteristics of the slots that are defined for the requested resource 114. For example, a reference (e.g., URL) to the requested resource 114 for which the content item slot 118 is defined, a size of the content item slot, a maximum number of presentation positions (or content items) that can be included in the content item slot 118, and/or media types that are eligible for presentation in the content item slot 118 can be provided to the content distribution system 110. Similarly, keywords associated with a requested resource ("resource keywords") or entities that are referenced by the resource can also be provided to the content distribution system 110 to facilitate identification of content items that are relevant to the requested resource 114. Content item requests can also include other information, such as information that the user has provided, geographic information indicating a state or region from which the request was submitted, or other information that provides context for the environment in which the content item will be displayed (e.g., a type of device at which the content item will be displayed, such as a mobile device or tablet device).

The content items that are provided in response to a content item request (or another request) are identified based, in part, on distribution parameters associated with the content items. Distribution parameters are a set of criteria upon which distribution of content items are conditioned. In some implementations, the distribution parameters for a particular content item can include distribution keywords that must be matched (e.g., by resource keywords or search queries) in order for the content item to be eligible for presentation. The distribution parameters can also require that the content item request include information specifying a particular geographic region (e.g., country or state) and/or information specifying that the content item request originated at a particular type of user device. The distribution parameters can also specify a bid and/or budget for distributing the particular content item. Bids can be used to select a set of content items for presentation with a resource and/or to determine in which presentation position the content item(s) will be presented.

The location of a content item slot on a publisher resource can have an impact on the performance of content items presented in the content item slot and/or user satisfaction with the resource. For example, content items that are presented near user interface elements, such as buttons of a web page, may receive more inadvertent clicks than content items that are presented near content that a user reads in detail. The inadvertent clicks may lead to user dissatisfaction with the resource (e.g., based on the user inadvertently being redirected to a landing page of the content item) and/or skewed performance measures.

The environment 100 includes a slot suggestion apparatus 120 that facilitates selection of suggested content item slot locations for publisher resources (e.g., resource 114). As discussed in detail below, the selection of the suggested content item slot locations considers, at least in part, user interaction patterns with the resources and performance information corresponding to content item slots for resources similar to the publisher resource for which the content item slot location is being suggested. The user interaction patterns with a resource can be represented, for example, using heat maps that are created based on user interaction data corresponding to user interactions with the resource.

Figure 2:
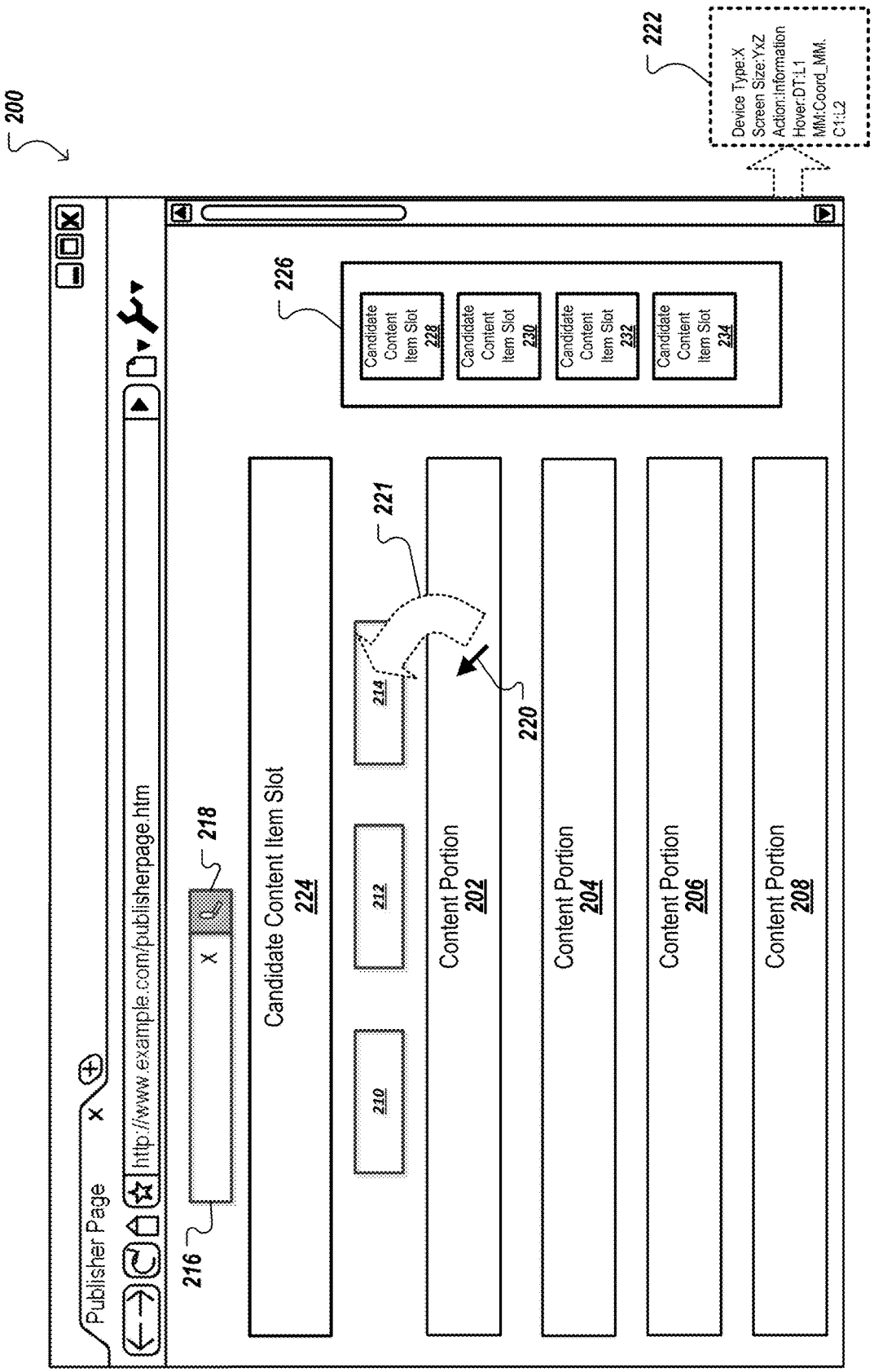
FIG. 2 is an example resource that can provide user interaction feedback.

FIG. 2 is an example resource 200 that can provide user interaction feedback. The resource 200 can be, for example, a publisher resource that is provided by a publisher. The resource 200 includes various portions of content 202, 204, 206, and 208. The various portions of content 202, 204, 206, and 208 can be, for example, job listings, links and/or summaries to news articles, posts in a content stream (e.g., posts in a social network stream), or embedded content (e.g., embedded audio files, video files, or other embedded content). The various portions of content to 202, 204, 206, and 208 can also be paragraphs of an article or some other form of content.

The resource 200 can also include various user interface elements. For example, the resource 200 can include links to related pages 210, 212, and 214. The resource 200 can also include a text input box 216 and a button 218 (or another user interface element) with which the user can initiate a search of the publisher's website or otherwise input information.

User interaction data specifying user interactions with the resource 200 can be obtained using a script that is embedded in the code of the resource 200. In some implementations, a publisher can be provided with a script that, upon execution of the resource code, causes a user device to log user interactions with the resource 200. For example, the script can detect pointer movements (e.g., mouse movements) over the resource 200, dwell times of a pointer over portions of the resource 200, clicks (or other affirmative selections) of content presented in the resource, and scrolling of the resource using a browser scrollbar.

For purposes of illustration, assume that a user is reading the portion of content 202. In this example, the user may hover their mouse 220 over the content 202 as they read. The script that logs the user interactions can detect that the mouse 220 is being hovered over the content 202, and log user interaction data 222 specifying an action of "hover" and specifying information corresponding to the hover. The information corresponding to the hover can include, for example, a dwell time "DT" and a location "L1" of the particular portion of the resource where the mouse was hovered (e.g., the amount of time that the mouse was hovered over the content 202.

Similarly, assume that after reading the content 202, the user moves the mouse 220 over the related link 214 (as illustrated by the dashed arrow 221) and clicks on the related link 214. In this example, the script that logs the user interactions can detect the mouse movement as well as the click on the related link 214 and log user interaction data 222 specifying the mouse movement "MM," coordinates corresponding to the path of the mouse movement "coord_MM," the click "C1" on the related link 214, and the location "L2" of the click C1. The script can continue to monitor user interactions with various portions of the resource 200 and generate the user interaction data 222 corresponding to the user interactions to the slot suggestion apparatus 120.

In some implementations, the user device executing the script can include additional information in the user interaction data 222. For example, the device type (e.g., desktop, laptop, tablet, or mobile device) can be included in the user interaction data 222. Additionally, the screen size (e.g., dimensions) and/or resolution can be included in the user interaction data 222. As discussed in more detail below, this information can be used to collect device or display size specific information for resources so that different content item slot locations can be selected on a per-device-type and/or per-screen-size basis. The user interaction data can be transmitted to, and received by, the slot suggestion apparatus 120, which can use the user interaction data to create a heat map for the resource 200 and suggest content item slot locations, as discussed in more detail below.

The resource 200 also includes two candidate content item slot locations areas 224 and 226. The candidate content item slot area 224 is a top banner location and the candidate content item slot location area 226 is a side bar slot location that includes multiple different candidate content item slots 228, 230, 232, and 234. One or more of these candidate content item slot areas and/or locations can be suggested to the publisher as described in more detail below.

Figure 3A:
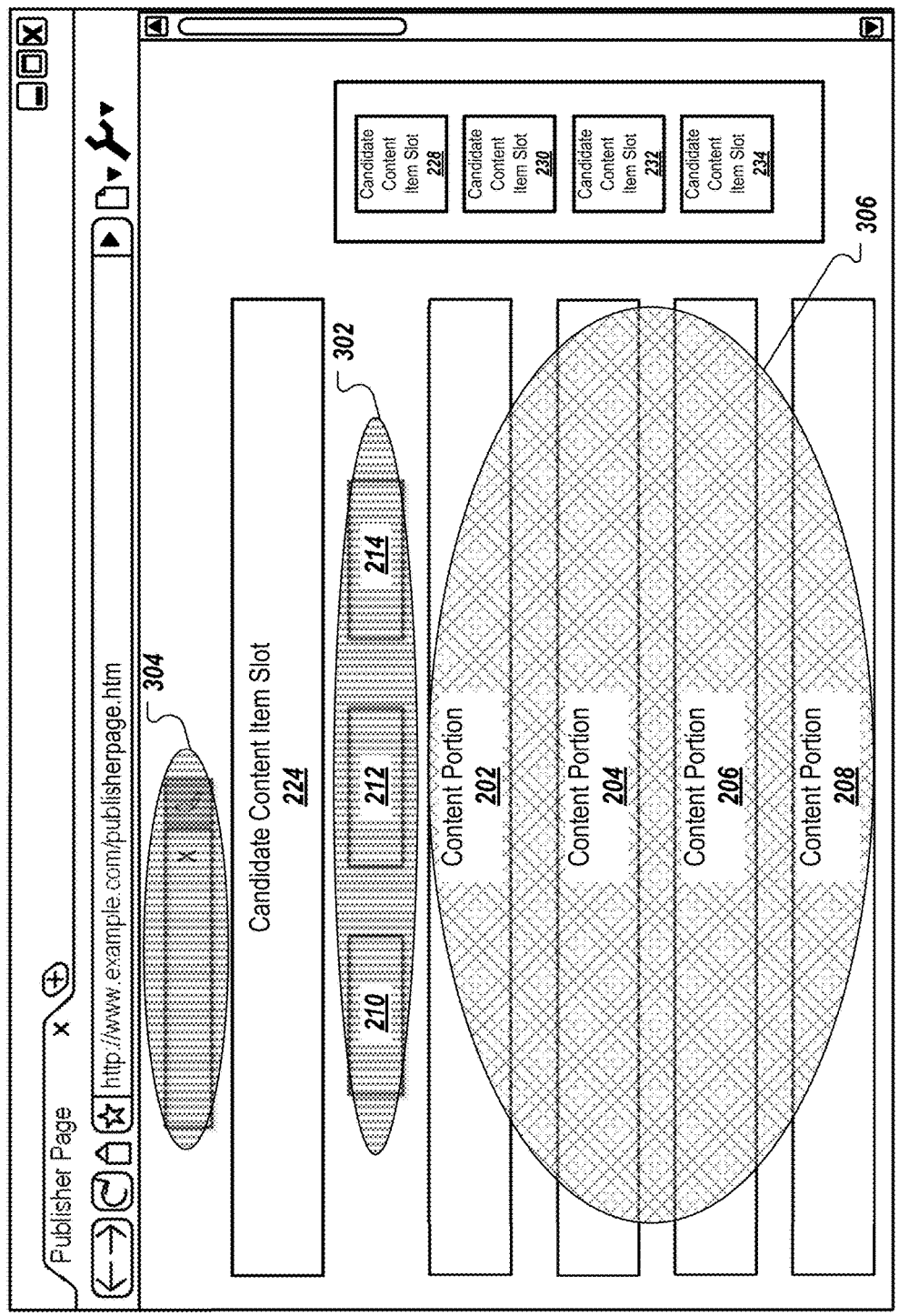
FIG. 3A is an illustration of a heat map overlaid on the example resource.

FIG. 3A is an illustration of a heat map overlaid on the example resource 200 of FIG. 2. The heat map specifies levels (or types) of interaction with various portions of the resource 200. For example, different colors, textures, patterns, or other visual distinctions can be used to represent different levels (or types) of user interaction with the various portions of the resource.

For purposes of illustration, assume that different patterns represent different types of user interactions that are dominant in a portion of the resource 200 over which the different patterns are located. For example, the fill pattern in the areas 302 and 304 can be an indication that user clicks are the most dominant (e.g., most common) user interaction with the portion of the resource that is in the areas 302 and 304. Meanwhile, the fill pattern in the area 306 may indicate that the "hover" action (e.g., mouse or pointer hover) is the most dominant (e.g., most common) user interaction with the portion of the resource that is in the area 306.

Figure 3B:
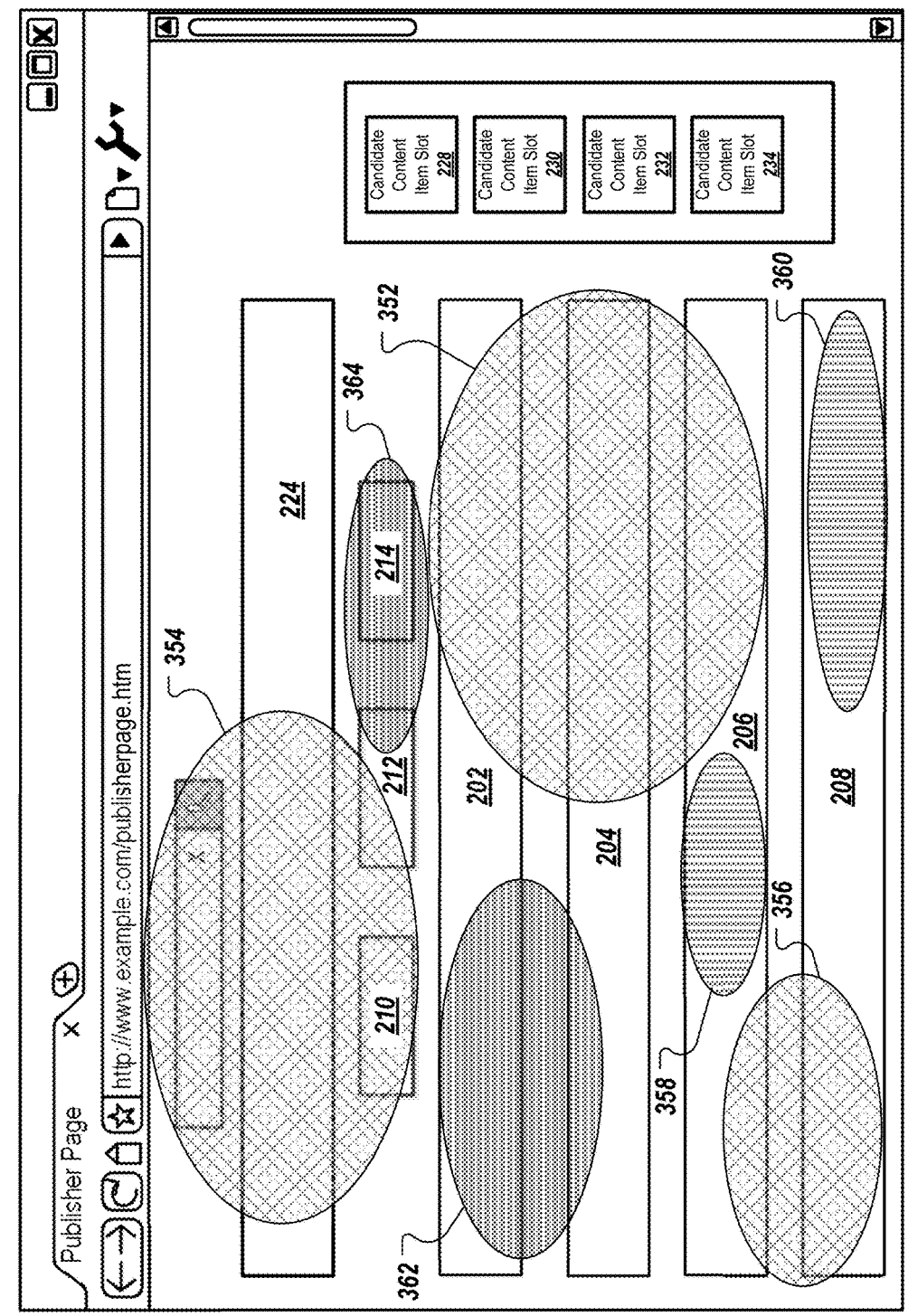
FIG. 3B is another illustration of a heat map overlaid on the example resource.

FIG. 3B is another illustration of a heat map overlaid on the example resource 200. With reference to FIG. 3B, assume that different patterns represent different aggregate levels of user interaction with the portion of the resource 200 over which the different patterns are located. For example, the fill pattern in the areas 352, 354, and 356 (among other areas of the resource 200) can indicate that these portions of the resource 200 receive the highest aggregate amount of user interaction. The fill pattern in the areas 358 and 360 can indicate that these portions of the resource 200 receive a second highest aggregate amount of user interaction, and the fill pattern in the areas 362 and 364 indicate that these portions of the resource 200 receive a third highest aggregate amount of user interaction. Additional fill patterns, different colors, or other differences between the heat map can specify further differences in the level of user interaction with different portions of the resource 200.

In some implementations, the aggregate amount of user interaction used for purposes of creating the heat map can be based on a total number of user interactions with each specific location of the resource 200. For example, the aggregate amount of user interactions can be a sum of a total number of user clicks on the specific location, a total number of hovers (e.g., that exceed a specified dwell time), and/or a total number of mouse movements over the specific location.

In some implementations, the contribution of each user interaction to the aggregate amount of user interaction with the resource 200 can be weighted based on the type of user interaction. For example, clicks may be weighted higher than hovers, which may be weighted higher than mouse movements or scrolls, such that each click may contribute more to the aggregate amount of user interaction with the resource 200 than hovers, which may contribute more to the aggregate than mouse movements or scrolls. In some implementations, hovers may be weighted higher than clicks.

Additionally, or alternatively, a separate heat map can be created for each different type of user interaction. For example, one heat map can indicate a magnitude of the user clicks on each specific location of the resource 200, while another heat map can indicate a magnitude of the dwell time on each specific location of the resource 200 (e.g., based on the user interaction data 222). Similarly, another heat map can indicate a magnitude of the number of mouse movements over each specific location of the resource 200.

The heat maps and shown in FIGS. 3A and 3B are graphical representations of heat maps that can be created using the user interaction data 222. As used throughout this document, the term heat map includes not only the graphical representations of heat maps shown in FIGS. 3A and 3B, but also includes other representations such as data structures storing heat map data (e.g., location and magnitude or dominant interaction type data) for different portions of a resource.

As discussed in detail with reference to FIG. 4, the heat map for a resource can be used, in part, to identify suggested content item slot locations for a publisher resource. For example, a data processing apparatus, such as the slot suggestion apparatus 120, can examine the heat map to identify content item slot locations that are likely to provide at least a specified amount of content item performance, while also limiting potentially negative user experiences related to presentation of content items in the content item slots.

In some implementations, potentially negative user experiences can be limited, for example, by using a set of conditions that specify locations where a content item slot may (or may not) be located on a particular resource. The set of conditions can be selected based on the potential negative user experiences (e.g., such as a user inadvertently clicking on an advertisement because it is too close to resource content or is too similar to resource content) that can be related to presentation of a content item with a resource.

Conditions on where content item slots can be located on a resource can include, for example, preventing content item slots from being located closer than a specified distance (e.g., in pixels) from a user interface element that receives a high number of clicks (e.g., relative to the number of clicks received by other user interface elements of the resource and/or as indicated by the heat map). Similarly, content item slots can be prevented from having the same dimensions or style as content presented in the resource to reduce the likelihood that a user will mistake the content item for content of the resource. Other conditions can be specified as appropriate, and the conditions that are specified for one type of resource (e.g., a publisher web page related to a particular topic) may differ from the conditions that are specified for another type of resource (e.g., a social media stream).

Figure 4:
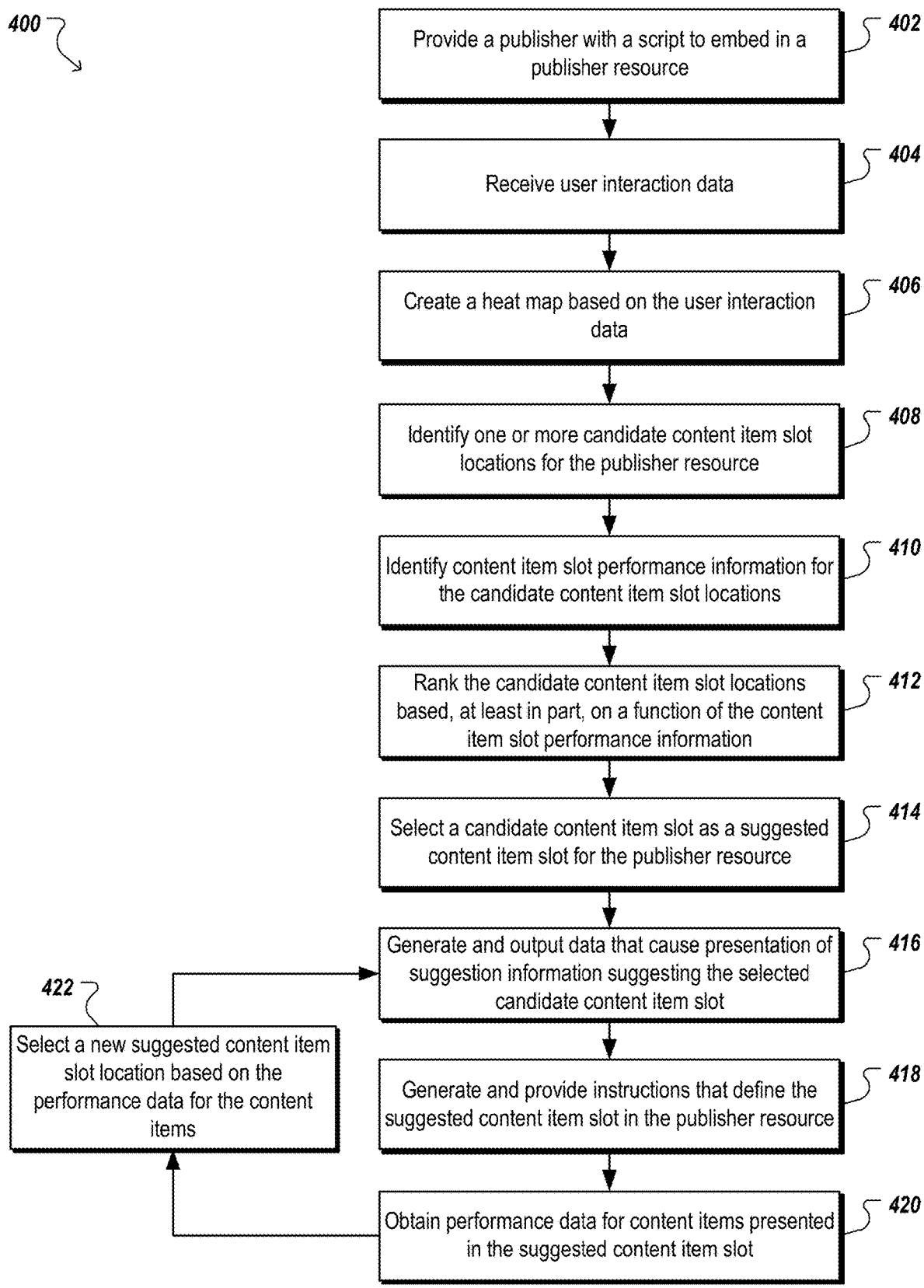
FIG. 4 is a flow chart of an example process for suggesting a content item slot location for a publisher resource.

FIG. 4 is a flow chart of an example process 400 for suggesting a content item slot location for a publisher resource. The process 400 can be performed, for example, by one or more data processing apparatus, such as the slot suggestion apparatus 120 of FIG. 1. Operations of the process 400 can be implemented by instructions that when executed cause one or more data processing apparatus to perform operations of the process 400. The instructions can be stored on a non-transitory computer readable medium.

A script is provided to a publisher (402). In some implementations, the script is provided to be embedded in a publisher resource provided by the publisher. The script can include instructions that cause a user device that renders the publisher resource to detect and/or log user interactions with the resource. For example, as discussed above with reference to FIG. 2, the script can cause the user device executing the script to detect mouse movements, clicks on user interface elements, hovers, and resource scrolling. The script can further cause the user device to log user interaction data specifying the user interactions and transmit the user interaction data to a data processing apparatus, such as the slot suggestion apparatus 120, or a data store.

User interaction data specifying user interactions with the publisher resource are received (404). As discussed above, the user interaction data can specify various user interactions with the resource and other information related to the user interactions. For example, information related to a user click can specify a location of the resource (e.g., coordinates of the resource) at which the user click was detected. Similarly, information related to a mouse movement can specify a path (e.g., set of resource coordinates) over which the mouse traveled. Information related to a hover action can specify, for example, a location (e.g., coordinates or user interface element) over which the hover occurred and/or a dwell time specifying how long the hover occurred (e.g., how long a mouse pointer was hovered over the location).

The user interaction data can also include, for example, additional information specifying, for example a device type (e.g., mobile, tablet, or desktop) from which the user interaction data are being received (and/or at which the user interaction data were obtained). The user interaction data can also specify a size (e.g., dimensions) and/or resolution of the display on which the publisher resource was presented when the user interaction data was obtained.

A heat map is created based on the user interaction data (406). In some implementations, the heat map specifies levels of user interaction with various portions of the publisher resource. For example, as discussed above with reference to FIGS. 3A and 3B, the heat map can show an aggregate level of user interaction with each different location of the resource and/or different types of user interactions that are most dominant (e.g., occur most often) relative to each different location of the resource. As discussed above, a different heat map can be created for each different type of user device (e.g., mobile, tablet, laptop, or desktop) and/or each different screen size in which the publisher resource is presentable.

One or more candidate content item slot locations are identified (408). In some implementations, the one or more candidate content item slot locations are various locations at which a content item slot can be included in the publisher resource. The candidate content item slots can include, for example, a set of specified locations that are available for presentation of content items. The set of specified locations can include top page and bottom page banner locations that are located above and below content of the resource, side bar locations that are located on a side of the resource adjacent to content of the resource, in-stream locations that are within a content stream (e.g., a social network stream or news feed), and in-content locations (e.g., locations that are embedded in the content of the resource).

In some implementations, the candidate content item slot locations include all locations in the set of specified locations. In some implementations, the candidate content item locations include fewer than all of the locations in the set of locations. For example, the candidate content item locations can be a subset of the locations in the set of locations, where the subset includes only those locations that meet location conditions. For purposes of example, assume that one condition specifies that a content item slot location is only eligible to be a candidate content item slot location if the content item slot location is farther than a specified distance from a user interface element that receives a specified number, portion, or level of clicks (e.g., based on the heat map). In this example, the locations of the content item slot locations in the set of locations can be compared to portions of the heat map indicating that the specified number, portion, or level of clicks are received. Any of the locations that are within the specified distance of these portions of the heat map can be filtered (or otherwise not included) in the candidate content item slot locations.

Content item slot performance information is identified for each of the one or more candidate content item slot locations (410). In some implementations, the content item slot performance information specifies one or more performance measures for content items presented in each of the various candidate content item slot locations. For example, for each candidate content item slot location, the content item slot performance information can specify a number of impressions that were received by content items presented in the content item slot location, a number of user interactions with (e.g., clicks of) content items that were presented in the candidate content item slot location, an amount of revenue generated for the content sponsor (e.g., through sales or other conversions) by content items that were presented in the candidate content item slot location, an amount of revenue generated for the publisher (e.g., through payment to the publisher for presentation of content items in the content item slot locations, a number of conversions that were attributed to user interactions with the content items presented in the candidate content item slot location, an amount paid by content sponsors for distribution of the content items that were presented in the candidate content item slot location, as well as other performance measures (e.g., conversion rate or click through rate).

In some implementations, the identified content item slot performance includes content item slot performance for similar resources (e.g., similar to the publisher resource for which a content item slot is being suggested. The similar resources can be identified based on the heat maps for the resources. For example, other resources having heat maps that are considered to match the heat map for the publisher resource can be identified as similar resources to the publisher resource.

A heat map for a particular resource can be considered to match the heat map for the publisher resource if the two heat maps have at least a specified amount of similarity. For example, a difference measure can be determined based on a comparison of the two heat maps, and the difference measure can be compared to a specified threshold difference. If the difference measure is less than the specified threshold, the two heat maps can be considered to match, and the content item slot performance for the particular resource can be used for purposes of suggesting a content item slot location for the publisher resource.

The content item slot performance of the similar resource can include (or be based on) performance data for content items that were presented in content item slots at various locations of the similar resource. For example, performance data for content item slots at each of the locations of the candidate content item slots can be obtained, and used to predict the performance of each candidate content item slot if it is selected as a content item slot for the publisher resource.

In some implementations, the content item slot performance information for each candidate content item slot location is determined based on an aggregate measure of content item performance of the content items presented in content item locations corresponding to the location of the candidate content item slot. For example, the performance of a candidate content item slot that is located at a top banner position can be determined based on an average (or another measure of central tendency) content item performance for content items presented in the top banner positions of the similar resources. In some implementations, the performance corresponding to each resource can be weighted based on a measure of similarity between the heat map of that resource relative to the heat map of the publisher resource for which a suggested content item slot is being selected.

In some implementations, the content item slot performance information for each candidate content item slot location can specify a cost-per-mille (e.g., cost for each 1,000 impressions) for the candidate content item slot location and/or a conversion-per-dollar (e.g., number of conversions obtained for each dollar spent) for the candidate content item location. The cost-per-mille and/or conversion-per-dollar of the candidate content item slot location can be determined based on the aggregate (e.g., average) cost-per-mille and/or conversion-per-dollar of content item slots, in the similar resources, that are at the location of the candidate content item slot.

In some implementations, the cost-per-mille and/or conversion-per-dollar for each particular candidate content item slot location can also be estimated, at least in part, based on the heat map for the publisher resource for which a content item slot is being suggested. For example, the heat map for the publisher resource and the heat maps for the similar resources can be input into a machine learning system that predicts a number of impressions and a click through rate for the particular candidate content item slot based on the heat maps and the content item slot performance information. The cost-per-mille and/or conversion-per-dollar measures can be determined using the predicted number of impressions, the click through rate, and one or more predicted performance measures (e.g., total revenue to the publisher (or content sponsor) and/or conversion rate) that can be obtained using the performance measures of the similar resources.

The candidate content item slot locations are ranked based, at least in part, on a function of the content item slot performance information (412). In some implementations, the candidate content item slots are ranked based on a mathematical combination of the cost-per-mille for the candidate content item slot location and the conversion-per-dollar for the candidate content item slot location. For example, relationship (1) can be used to generate a score for each candidate content item slot location, and the candidate content item slot locations can be ranked based on the score.

$$\text{Score}_x = w_1 * \text{RPM}_x + w_2 * \text{CPD}_x \qquad (1)$$

where, $\text{Score}_x$ is the score for candidate content item slot location x;

$w_1$ is a first weighting factor;

$\text{RPM}_x$ is the revenue-per-mille for the candidate content item slot location x;

$w_2$ is a second weighting factor; and $\text{CPD}_x$ is the conversion-per-dollar for content item slot location x.

In some implementations, the first weighting factor and the second weighting factor are selected by an administrator of the slot suggestion apparatus 120. The weighting factors can be chosen to balance the interests of the publisher and the content sponsors that will provide content items for presentation in the suggested content item slot location. For example, the $\text{RPM}_x$ is a measure of the revenue that a publisher receives (or is predicted to receive) for each 1,000 presentations of content items in the content item slot location, while the $\text{CPD}_x$ is a measure of how many conversions a content sponsor will receive for each dollar spent providing content items for presentation in the content item slot location. Therefore, the weights can be adjusted in an attempt to identify content item slot locations that will provide at least a specified amount of benefit to each of the content sponsor and the publisher. A default weighting of 1.0 can be used for each of $w_1$ and $w_2$ in some implementations.

A candidate content item slot location is selected as a suggested content item slot location for the publisher resource (412). In some implementations, one of the various candidate content item slot locations is selected based on the heat map and one or more performance measures. For example, as discussed above, the score that is used to rank the candidate content item slot locations can be determined based on scores that are computed using an RPM and CPD of the respective candidate content item slot locations. These values can be derived from performance measures of similar resources, which are identified based, at least in part on the heat map of the publisher resource.

In some implementations, the selection of a suggested content item slot location includes selecting at least a highest ranked candidate content item slot location as a suggested content item slot location for the publisher resource. For example, the candidate content item slot location having the highest score (e.g., computed using relationship (1)) can be selected as a suggested content item slot location. If more than one candidate content item slot location is being selected as a suggested content item slot location, the candidate content item slot locations having the highest N scores (where N is an integer corresponding to the number of suggested content item slot locations being selected) can be selected as suggested content item slot locations.

In some implementations, a size of the suggested content item slot is determined. The size of the suggested content item slot can be determined, at least in part, based on whether the publisher resource supports dynamic slot sizing (e.g., based on a size of the content item being presented). If the publisher resource does not support dynamic slot sizing, then a standard slot size (e.g., as specified by a content distribution apparatus) can be selected. The standard size can be selected, for example, based on an amount of available space on the publisher resource. The standard size can also be selected, for example, based on the heat map for the publisher resource. For example, assume that the heat map shows that there is a high level of mouse hovering over a vertical section of the right side of the publisher resource and that the high level of mouse hovering extends from near the top of the publisher resource to about half way down the publisher resource. In this example, the size of the suggested content item slot can be selected to extend down the right hand side of the publisher resource near the area corresponding to the high level of user hovering.

When the publisher resource does support dynamic slot sizing, the size of the suggested content item slot can be selected based on content items that are eligible to be presented with the resource. For example, the minimum and/or maximum dimensions of the suggested content item slot can be set, at least in part, based on the minimum size and maximum size of the eligible content items. The minimum and/or maximum dimensions of the suggested content item slot can also consider information from the heat map, similar to that discussed above with reference to the standard size content item slots. The selected sizes of the content item slots can also be determined as part of the content item slot selection techniques discussed above. For example, each different possible size content item slot can be evaluated separately, and the size of the content item slot having the highest score will be the selected size.

Data that cause presentation of suggestion information that identify the selected candidate content item slot location as a suggested content item slot location for the publisher resource are generated and output (416). In some implementations, the suggestion data are generated and output in the form of an e-mail (or another notification) to the publisher of the publisher resource. In some implementations, the suggestion data are output for presentation in an account management system that provides the publisher with information regarding content item slot configuration and/or performance related to the publisher resource. The suggestion information can include information specifying the location of the suggested content item slot location and/or predicted performance information for the suggested content item slot location.

In some implementations, instructions that define the suggested content item slot are generated and provided (418). The instructions can include, for example, a portion of code that cause a content item slot to be inserted into the publisher resource at the suggested content item slot location. For example, the instructions can be inserted into the publisher resource such that when the publisher resource is rendered by a user device, execution of the instructions will cause the user device to request a content item for presentation at the suggested content item slot location. In some implementations, the instructions are provided to the publisher for insertion into the publisher resource.

Performance data for content items presented in the suggested content item slot location of the publisher resource are obtained (420). In some implementations, the performance data can be obtained, for example, based on user interactions with the content items that are presented in the suggested content item slot location. This performance data can include, for example, a number of impressions, a click through rate, a conversion rate (or number of conversions), a total amount paid to the publisher for presentation of content items in the suggested content item slot location, and/or other measures of performance.

A new suggested content item slot location can be provided based on the performance data for the content items (422). In some implementations, the new suggested content item slot location can be selected in a manner similar to that described above, and the selection techniques discussed above can use the performance data for the content items presented in the suggested content item slot location, in addition to (or instead of), the performance information corresponding to the other resources having similar heat maps relative to the publisher resource. In some implementations, the performance data corresponding to the publisher resource can be weighted more heavily than the performance information corresponding to the other resources. Once a new suggested content item slot location is selected, data that cause presentation of suggestion information suggesting the new suggested content item slot location can be generated and output (416) as discussed above.

Figure 5:
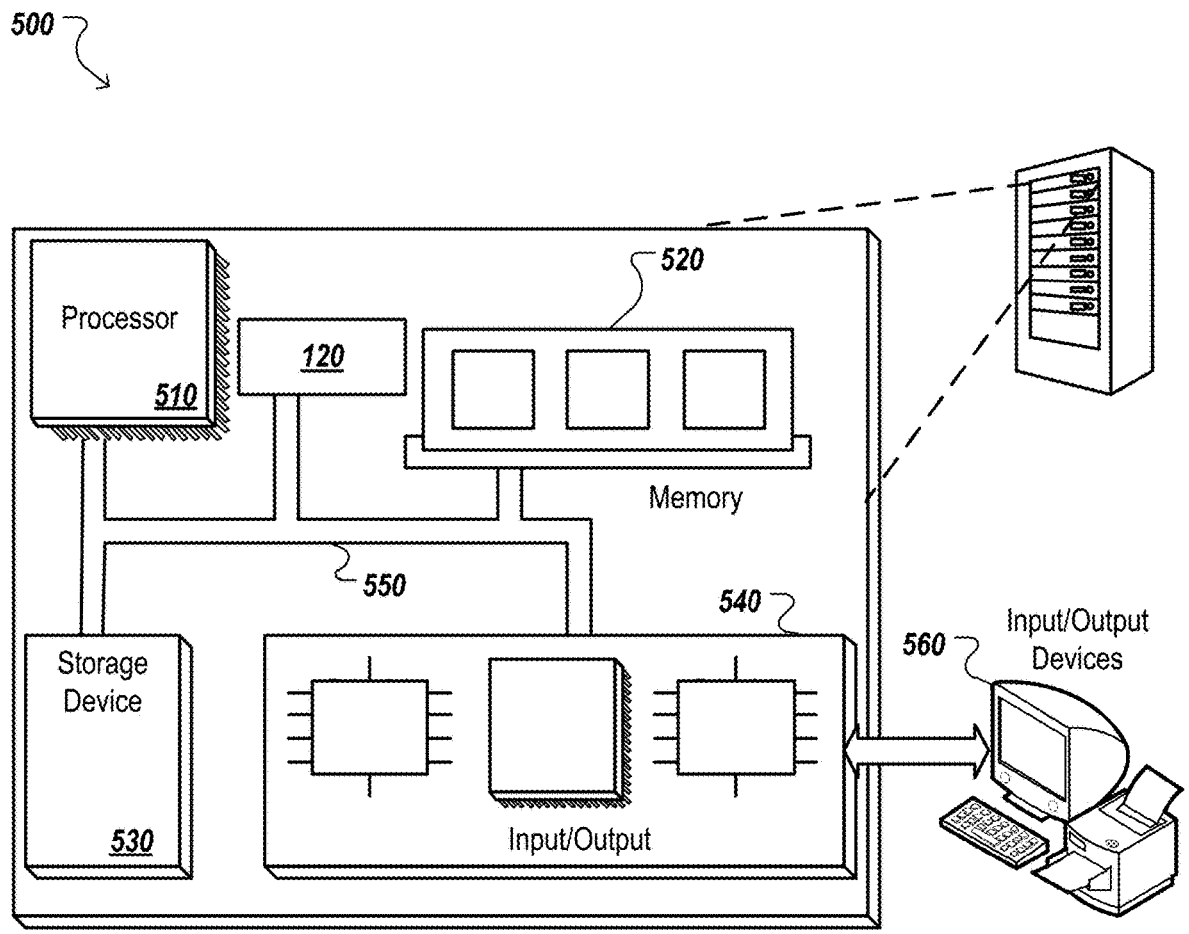
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, to the CISA 120 using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of identifying content slot locations on publisher resources, comprising:
   identifying, by a data processing apparatus having one or more processors, a first interaction statistics measurement for a first publisher resource on which one of a plurality of candidate content item slot locations is to be selected, the first interaction statistics measurement including a first heat map indicating a location and a corresponding magnitude for each interaction on the first publisher resource;
   identifying, by the data processing apparatus, a second interaction statistics measurement for a second publisher resource different from the first publisher resource, the second interaction statistics measurement including a second heat map indicating a location and a corresponding magnitude for each interaction on the second publisher resource;
   determining, by the data processing apparatus, that the second interaction statistics measurement for the second publisher resource is within a threshold difference of the first interaction statistics measurement for the first publisher resource;
   selecting, by the data processing apparatus responsive to determining that the second interaction statistics is within the threshold difference of the first interaction statistics measurement, a candidate content item slot location from the plurality of candidate content item slot locations on the first publisher resource using the second interaction statistics measurement for the second publisher resource;
   identifying, by the data processing apparatus, subsequent to selecting the candidate item slot location, a performance measure of a content item presented at the candidate item slot location on the first publisher resource;
   selecting, by the data processing apparatus, a second candidate content item slot location from the plurality of candidate content item slot locations on the first publisher resource using the performance measure of the content item presented at the candidate item slot location, the second candidate content item slot location different from the candidate item slot location; and
   causing, by the data processing apparatus, a content item slot to be inserted into the first publisher resource at the second candidate content item slot location selected using the second interaction statistics measurement.

2. The method of claim 1, wherein causing the content item slot to be inserted into the first publisher resource comprises generating, by the data processing system, instructions to include the content item slot at the second candidate item slot location on the first publisher resource and to generate a request for content to insert into the content item slot.

3. The method of claim 1, further comprising identifying, by the data processing system responsive to the determining that the second interaction statistics is within the threshold difference of the first interaction statistics measurement, performance data of content items presented in one or more content item slots on the second publisher resource; and
   wherein selecting the candidate content item slot location further comprises selecting the candidate content item slot location from the plurality of candidate content item slot locations using the performance data.

4. The method of claim 1, further comprising:
   determining, by the data processing apparatus, for each of the plurality of candidate content item slot locations, a predicted performance measure based on the second interaction statistics for the second publisher resource; and
   ranking, by the data processing apparatus, the plurality of candidate content item slot locations by the corresponding predicted performance measures, and
   wherein selecting the second candidate content item slot location further comprises selecting the second candidate content item slot location corresponding to one from the plurality of candidate content item slot locations ranked by corresponding predicted performance measures.

5. The method of claim 1, further comprising determining, by the data processing apparatus, the plurality of candidate item slot locations on the first publisher resource in accordance to a set of conditions specifying permissible locations for content items slots, the first publisher resource supporting dynamic slot sizing.

6. The method of claim 1, further comprising determining, by the data processing apparatus, the plurality of candidate item slot locations on the first publisher resource using predefined content items slots for the first publisher resource, the first publisher resource lacking support for dynamic slot sizing.

7. The method of claim 1, wherein identifying the first interaction statistics measurement further comprises identifying the first interaction statistics measurement indicating a corresponding interaction type for each interaction on the first publisher resource;
   wherein identifying the second interaction statistics measurement further comprises identifying the second interaction statistics measurement indicating a corresponding interaction type for each interaction on the second publisher resource.

8. The method of claim 1, further comprising generating, by the data processing apparatus for a content publisher associated with the first publisher resource, suggestion information identifying the second candidate content item slot selected from the plurality of candidate content item slots.

9. A system for identifying content slot locations on publisher resources, comprising:
   a data processing apparatus having one or more processors, configured to:
      identify first interaction statistics measurement for a first publisher resource on which one of a plurality of candidate content item slot locations is to be selected, the first interaction statistics measurement including a first heat map indicating a location and a corresponding magnitude for each interaction on the first publisher resource;

identify a second interaction statistics measurement for a second publisher resource different from the first publisher resource, the second interaction statistics measurement including a second heat map indicating a location and a corresponding magnitude for each interaction on the second publisher resource;

determine that the second interaction statistics measurement for the second publisher resource is within a threshold difference of the first interaction statistics measurement for the first publisher resource;

select, responsive to determining that the second interaction statistics is within the threshold difference of the first interaction statistics measurement, a candidate content item slot location from the plurality of candidate content item slot locations on the first publisher resource using the second interaction statistics measurement for the second publisher resource;

identify, subsequent to selecting the candidate item slot location, a performance measure of a content item presented at the candidate item slot location on the first publisher resource;

select a second candidate content item slot location from the plurality of candidate content item slot locations on the first publisher resource using the performance measure of the content item presented at the candidate item slot location, the second candidate content item slot location different from the candidate item slot location; and cause a content item slot to be inserted into the first publisher resource at the second candidate content item slot location selected using the second interaction statistics measurement.

10. The system of claim 9, wherein the data processing apparatus is further configured to cause the content item slot to be inserted into the first publisher resource by generating instructions to include the content item slot at the second candidate item slot location on the first publisher resource and generating a request for content to insert into the content item slot.

11. The system of claim 9, wherein the data processing apparatus is further configured to:

identify, responsive to the determining that the second interaction statistics is within the threshold difference of the first interaction statistics measurement, performance data of content items presented in one or more content item slots on the second publisher resource; and select the candidate content item slot location from the plurality of candidate content item slot locations using the performance data.

12. The system of claim 9, wherein the data processing apparatus is further configured to:

determine, for each of the plurality of candidate content item slot locations, a predicted performance measure based on the second interaction statistics for the second publisher resource;

rank the plurality of candidate content item slot locations by the corresponding predicted performance measures; and select the second candidate content item slot location corresponding to one from the plurality of candidate content item slot locations ranked by corresponding predicted performance measures.

13. The system of claim 9, wherein the data processing apparatus is further configured to determine the plurality of candidate item slot locations on the first publisher resource in accordance to a set of conditions specifying permissible locations for content items slots, the first publisher resource supporting dynamic slot sizing.

14. The system of claim 9, wherein the data processing apparatus is further configured to determine the plurality of candidate item slot locations on the first publisher resource using predefined content items slots for the first publisher resource, the first publisher resource lacking support for dynamic slot sizing.

15. The system of claim 9, wherein the data processing apparatus is further configured to:

identify the first interaction statistics measurement indicating a corresponding interaction type for each interaction on the first publisher resource;

identify the second interaction statistics measurement indicating a corresponding interaction type for each interaction on the second publisher resource.

16. The system of claim 9, wherein the data processing apparatus is further configured to generate, for a content publisher associated with the first publisher resource, suggestion information identifying the second candidate content item slot selected from the plurality of candidate content item slots.

\* \* \* \* \*